United States Patent
Little et al.

(10) Patent No.: US 7,452,406 B2
(45) Date of Patent: Nov. 18, 2008

(54) DEVICE AND METHOD FOR REMOVING WATER AND CARBON DIOXIDE FROM A GAS MIXTURE USING PRESSURE SWING ADSORPTION

(75) Inventors: William A. Little, Palo Alto, CA (US); Sam Spektor, Campbell, CA (US)

(73) Assignee: MMR Technologies Inc., Mountain View, CA (US)

( * ) Notice: Subject to any disclaimer, the term of this patent is extended or adjusted under 35 U.S.C. 154(b) by 611 days.

(21) Appl. No.: 11/077,795

(22) Filed: Mar. 10, 2005

(65) Prior Publication Data
US 2005/0199124 A1 Sep. 15, 2005

Related U.S. Application Data

(60) Provisional application No. 60/552,459, filed on Mar. 12, 2004.

(51) Int. Cl.
*B01D 53/047* (2006.01)
(52) U.S. Cl. .............. 95/97; 95/104; 95/117; 95/122; 95/139; 96/121; 96/130; 96/154
(58) Field of Classification Search ............ 95/96, 95/104, 117, 121, 122, 139, 97; 96/121, 96/130, 143, 154
See application file for complete search history.

(56) References Cited

U.S. PATENT DOCUMENTS

| | | | |
|---|---|---|---|
| 4,726,815 A | 2/1988 | Hashimoto et al. ........... 95/41 |
| 5,061,455 A * | 10/1991 | Brose et al. ............ 96/122 |
| 5,271,762 A | 12/1993 | Schoofs et al. ............ 95/120 |
| 5,676,737 A | 10/1997 | Whitlock ............ 95/90 |
| 5,728,198 A * | 3/1998 | Acharya et al. ............ 95/114 |
| 5,792,239 A | 8/1998 | Reinhold, III et al. ............ 95/101 |
| 6,171,370 B1 | 1/2001 | Hirano et al. ............ 95/96 |
| 6,358,302 B1 | 3/2002 | Deng et al. ............ 95/96 |
| 6,444,012 B1 | 9/2002 | Dolan et al. ............ 95/99 |
| 6,631,626 B1 | 10/2003 | Hahn ............ 62/612 |
| 6,638,340 B1 | 10/2003 | Kanazirev et al. ............ 95/96 |
| 2006/0165574 A1* | 7/2006 | Sayari ............ 423/210 |

OTHER PUBLICATIONS

Authors: G.B.T. Tan (1); H. Funke, W. Knorr & L. Schauer (2) (1) Thermal Control & Life Support Division, ESTEC (2) DASA-DORNIER GmbH (D) Title: Carbon Dioxide Removal [online] [Retrieved on Mar. 10, 2005] Retrieved from the internet: <URL: http://esapub.esrin.esa.it/pff/pffv5n1/tan15.htm>.

* cited by examiner

*Primary Examiner*—Robert A. Hopkins
(74) *Attorney, Agent, or Firm*—Lumen Patent Firm, Inc.

(57) ABSTRACT

A pressure swing adsorption (PSA) dryer for separating water and carbon dioxide from a gas stream includes two compound adsorbent columns [32, 42]. Each column comprises a primary adsorption material for adsorbing water and a secondary adsorbent that adsorbs carbon dioxide. The secondary adsorbent comprises a solid amine. The secondary adsorbent may be, for example, a highly porous polystyrene matrix with amine groups bonded to the porous resin structure. Preferably, a mixture of the primary and secondary adsorbent materials forms an intermediate layer [38, 48] sandwiched between a top layer [34, 44] and bottom layer [36, 46] of pure water adsorbent material in each of the columns [32, 42].

14 Claims, 2 Drawing Sheets

DEVICE AND METHOD FOR REMOVING WATER AND CARBON DIOXIDE FROM A GAS MIXTURE USING PRESSURE SWING ADSORPTION

CROSS-REFERENCE TO RELATED APPLICATIONS

This application claims priority from U.S. provisional patent application 60/552,459 filed Mar. 12, 2004, which is incorporated herein by reference.

FIELD OF THE INVENTION

This invention relates generally to devices and methods for separating gasses. More specifically, it relates to devices and methods for removing water and carbon dioxide from a gas mixture using pressure swing adsorption.

BACKGROUND OF THE INVENTION

A well-known technique for separating gasses is pressure swing adsorption (PSA). An important application of the PSA process is in PSA dryers which reduce the concentration of various gasses or impurities in a compressed air stream. For example, PSA dryers are used to remove water vapor from air entering nitrogen and oxygen liquefiers. Nitrogen and oxygen liquefiers comprise two integrated distillation columns which operate at very low temperatures. Consequently, it is essential that water vapor and carbon dioxide be removed from the gas flowing into the liquefier. Without such pre-purification, these impurities will condense in the low temperature sections of the liquefier, blocking the flow. In order to prevent freeze up, the content of water vapor and carbon dioxide in the gas stream entering the liquefier should be less than a few parts per million ($\mu g/g$).

A conventional PSA dryer 4 is illustrated in FIG. 1. The device operation involves alternating forward and backward cycles. In the forward cycle illustrated in the figure, a stream of compressed air 10 downstream from a compressor 6 enters dryer 4 and is directed through a four-way valve 12 to pass through a first column 14 containing a molecular sieve 28 or other adsorbent which adsorbs water vapor present in the stream. A product flow 11, consisting of most of the dry air exiting the column 14, flows through a first one-way check valve 20 and exits the device 4 as a purified product stream 22. A purge flow 13, containing a residual portion of the dry air exiting the column 14, passes through a restrictive aperture or metering capillary 18 where its pressure drops and its volume increases. The dry purge flow 13 then passes through a second column 26 containing an adsorbent 30. The dry flow desorbs water vapor present in the column 26, and the resulting moist flow is directed through four-way valve 12 so it is vented from device 4 as a moist exhaust flow 16. After a period of time, the four-way valve 12 is switched to reverse the direction of flow from forwards to backwards, i.e., so that the flow is circulating clockwise rather than counter-clockwise. The operation of the device during the backward cycle is analogous to the operation in the forward cycle. After operating for a period of time in this backward cycle, the four-way valve 12 is again switched, causing the flow to reverse again.

During each cycle, one of the two columns 14 and 26 is adsorbing moisture while the other column is being purged of moisture that it had adsorbed in the previous cycle. Even though the purge flow represents only a minority of the high pressure flow by weight, the volume of the low-pressure purge flow taking up moisture from one column is actually larger than the volume of the high-pressure input flow giving up moisture to the other column. Consequently, the dry purge flow is able to remove nearly all the moisture adsorbed by the column in the previous cycle, preparing for the next cycle when the column will again adsorb moisture from the entering high-pressure flow. Using commonly available molecular sieve adsorbents, the PSA dryer can reduce the water content of the incoming stream 10 so that the concentration of water in product stream 22 is a few $\mu g/g$ or less.

In many applications where PSA dryers are used, however, it is also important to reduce the concentrations of carbon dioxide, sulfur dioxide, oil vapor, and other secondary substances to a few $\mu g/g$. For example, nitrogen and oxygen liquefiers are quickly clogged by condensation of carbon dioxide and other impurities if the concentrations of these secondary substances are larger than a few $\mu g/g$.

One approach to reducing the concentration of these secondary substances is to provide an irreversible filter external to the PSA dryer. As shown in FIG. 1, a pre-filter 8 may be positioned between the compressor 6 and dryer 4 to remove a secondary substance from the compressed air prior to entering the PSA dryer. Alternatively, the filter 8 could be placed downstream from the dryer 4 to filter product flow 22. As an example, filter 8 may be a small irreversible filter made of asbestos coated with sodium hydroxide. Such a filter can be used to adsorb carbon dioxide. These filters are commonly used in night-vision Joule-Thompson cryogenic coolers. Periodically, however, the filter becomes saturated and must be disposed and replaced. In addition to adding expense to the device, these filters generate toxic waste and are dangerous to handle. Thus, it would be desirable to eliminate such irreversible filters, if possible.

Even without the irreversible filter 8, the PSA dryer 4 will itself reduce the concentration of some secondary substances, but only to a limited degree. For example, using molecular sieve adsorbents 28 and 30 that are able to adsorb molecules as large as 1 nanometer in diameter, the PSA dryer 4 can reduce the concentration of carbon dioxide, sulfur dioxide, oil vapor, and other secondary substances. However, these adsorbents conventionally used in PSA dryers have a significantly higher affinity for water vapor than for these secondary substances. Consequently, a PSA dryer that reduces the water content to a few $\mu g/g$ will not reduce the concentration of secondary substances to equally low values. Thus, the product stream 22, while having reduced concentrations of secondary substances such as carbon dioxide, these concentrations remain significantly larger than a few $\mu g/g$.

One way to modify the PSA dryer to further reduce the concentration of secondary substances in the product stream 22 is to increase the size of the adsorbent columns 14 and 26 and volume of adsorbents 28 and 30. This solution reduces the concentrations of both water and secondary substances in the produce stream 22. Because the larger adsorbents significantly increase the size, weight and cost of the PSA dryer, this approach is practical only for large-scale industrial PSA devices. Another approach is to increase the amount of the purge flow 16, which demands a significantly larger compressor 6 to provide higher pressure. Consequently, this solution also increases the size, weight, and cost of the device, as well as increasing its power consumption. This solution, therefore, is useful only in large-scale industrial applications, and is not practical in small, compact PSA dryers.

Another approach to reducing the concentrations of secondary substances in the product flow 22 is to provide a more effective adsorbent 28, 30 in the PSA columns 14, 26. For example, U.S. Pat. No. 6,638,340 to Kanazirev, et al. discloses a solid adsorbent material composed of a zeolite, alumina, and metal. The adsorbent is designed to remove multiple contaminants such as water and carbon dioxide from an air stream during a PSA process. This adsorbent, however, is not readily available and requires careful handling because of the reactive metals used in the preparation. Consequently, it is relatively costly to prepare. Moreover, a PSA dryer using this adsorbent needs a large purge flow and thus a large compressor. This adsorbent, therefore, is only suitable for use in large PSA dryers in an industrial plant. Similarly, U.S. Pat. No. 6,358,302 to Deng, et al. discloses a multi-composite adsorbent that comprises one water vapor removal adsorbent, one carbon dioxide removal adsorbent, and a third adsorbent which can selectively adsorb hydrocarbons and/or nitrogen oxides. The carbon dioxide adsorbent is a zeolite, and the water adsorbent is an activated alumina, silica gel, or non-zeolite desiccants. This adsorbent, however, has a weaker affinity for carbon dioxide than for water. Thus, a PSA dryer using this adsorbent has the disadvantage that it needs a large purge flow, and hence a large compressor. In view of these problems with the current state of the art, it would be an advance in the art of PSA dryers to overcome these various disadvantages that are especially relevant to the need for compact PSA dryers used in smaller scale applications.

SUMMARY OF THE INVENTION

In one aspect, the present invention provides a PSA dryer that includes a compound adsorbent for separating water and carbon dioxide from a gas stream passing through the dryer. The compound adsorbent reduces the required purge flow in the PSA dryer as compared to a PSA dryer with a conventional adsorbent in each of its columns. The compound adsorbent column comprises a primary adsorbent material that adsorbs water, combined with a secondary adsorbent material that selectively adsorbs carbon dioxide. The secondary adsorbent comprises a solid amine. For example, the secondary adsorbent may be a highly porous polystyrene matrix with amine groups bonded to a porous resin structure. The weak basic amine groups selectively adsorb acidic carbon dioxide when high-pressure gas flows through the adsorbent during operation of the PSA dryer. The secondary adsorbent particle sizes typically range from 0.5 to 1.2 mm. In one embodiment, the compound adsorbent comprises about 80% primary adsorbent and 20% secondary adsorbent, by volume. The two adsorbents are preferably packed in the column inhomogeneously in three layers: a top layer and a bottom layer, both containing just primary adsorbent material, and a middle layer sandwiched between the top and bottom layers. The middle layer contains a mixture of the primary and secondary adsorbent materials. Preferably, the top layer represents approximately 20% of the column volume and the bottom layer also represents approximately 20% of the column volume, leaving 60% of the center portion of the volume filled by the mixture in the middle layer containing 70% primary adsorbent and 30% secondary adsorbent.

In another aspect of the invention, a method is provided for reducing the concentration of water and carbon dioxide in a gaseous stream using pressure swing adsorption. The method comprises passing the gaseous stream through a first adsorbent column to produce a dry flow having reduced water and carbon dioxide content. The dry flow is divided into a product flow and a purge flow. The volume of the purge flow is increased and the pressure of the purge flow is decreased to produce an expanded purge flow which passes through a second adsorbent column to produce a moist exhaust flow having increased water and carbon dioxide content. The direction of flow through the first and second adsorbent columns is reversed. Significantly, each of the first and second adsorbent columns comprises a mixture of primary and secondary adsorbents, wherein the primary adsorbent adsorbs water and the secondary adsorbent adsorbs carbon dioxide, wherein the secondary adsorbent comprises a solid amine such as a macroporous, divinylbenzene-crosslinked polymer with benzylamine groups or a porous polystyrene matrix with amine groups bonded to a porous resin structure. Preferably, the mixture is inhomogeneously packed in the columns in stratified layers, e.g., in a top layer, a bottom layer, and a middle layer sandwiched between the top layer and bottom layer. Both the top layer and the bottom layer may contain just primary adsorbent material, and the middle layer may contain a mixture of the primary and secondary adsorbent materials. The volume fractions of the middle layer, the top layer, and bottom layer are approximately 60%, 20%, and 20%, respectively. In the middle layer, the volume ratio of the primary adsorbent to the secondary adsorbent is preferably in the range 80:20 to 60:40.

DETAILED DESCRIPTION

Figure 1:
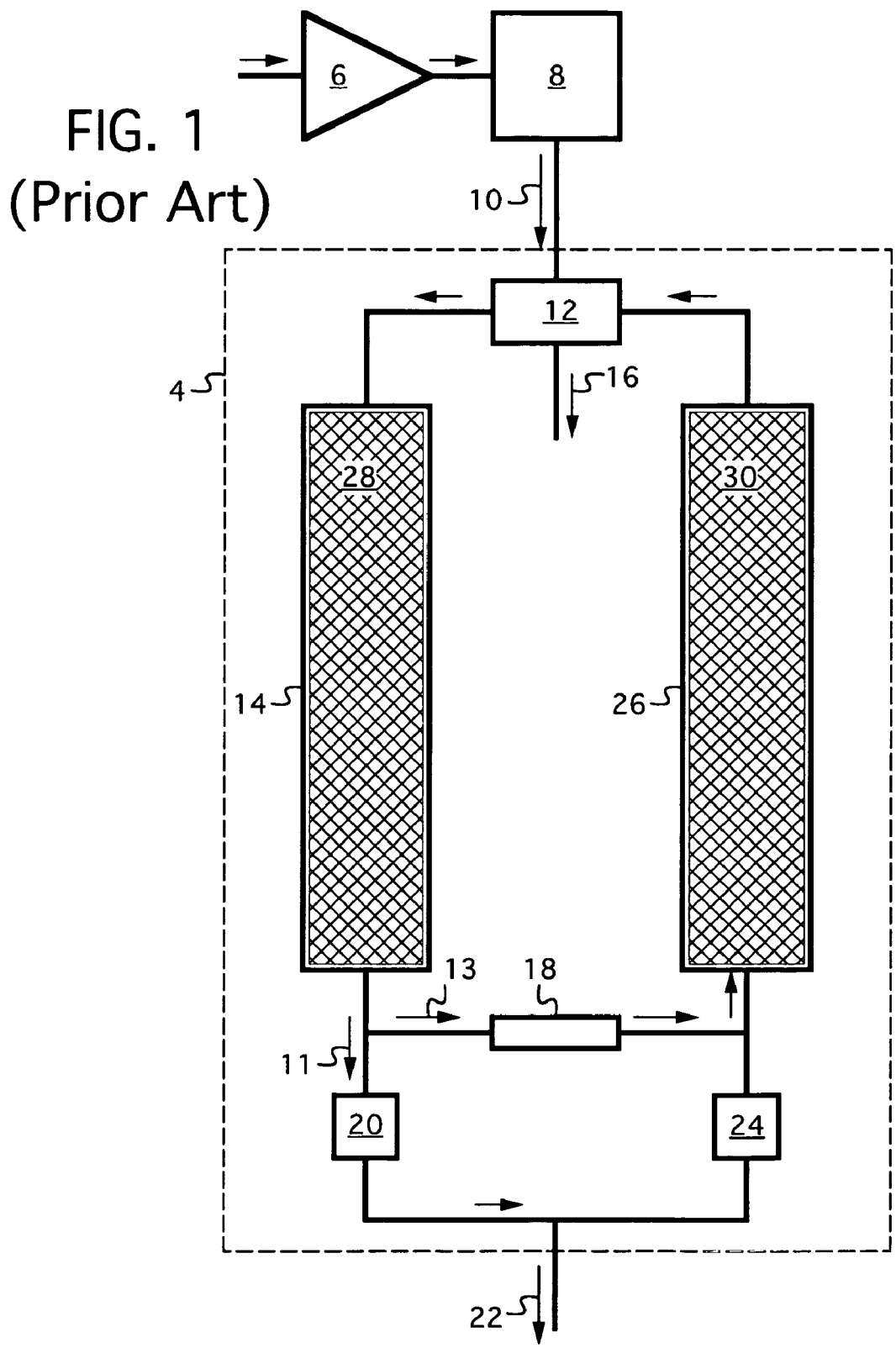
FIG. 1 is a schematic diagram illustrating a conventional PSA dryer.

To illustrate the present invention, it is instructive to first consider in more detail the design and operation of the conventional PSA dryer 4 shown in FIG. 1. A compressor 6 and optional pre-filter 8 provide a stream of compressed air 10 which enters the PSA dryer at a high pressure (e.g., about 800 kPa). A product stream 22 purified of water exits the dryer. In the forward cycle, the stream of compressed air 10 enters a four way valve 12 and is directed to a first column 14 which adsorbs water vapor present in the stream. The dry air flows out of column 14 and is divided into a product flow 11 and a purge flow 13. The product flow 11, consisting of a majority of the dry air (e.g., about 82%), flows through a first one-way check valve 20 and exits the device as a purified product stream 22. The purge flow 13, containing the remainder of the dry air (e.g., about 18%), passes through a restrictive aperture or metering capillary 18 where its pressure drops from the high pressure to a low pressure (e.g., from 800 kPa to about 100 kPa) and its volume increases proportionally. Because the pressure of the purge flow has dropped on the downstream side of the metering capillary 18, it does not pass through second one-way check valve 24, but instead flows through a second column 26. As the dry purge flow passes through column 26, it desorbs water vapor present in the column and carries the vapor out of the column. The moist vapor then passes through four-way valve 12 and is vented as a moist exhaust flow 16. While operating in this forward cycle, the amount of moisture present in first column 14 increases while the amount of moisture present in second column 26 decreases. Columns 14 and 26 contain molecular sieve adsorbents 28 and 30, respectively, designed specifically to have a high affinity to water vapor.

After about 30 seconds, the four-way valve 12 is switched to reverse the direction of flow from forward (i.e., counter clockwise in the figure) to backward (i.e., clockwise in the figure). The operation of the device during the backward cycle is analogous to the forward cycle. Specifically, the compressed air 10 entering the device flows through four-way valve 12 and into the second column 26 which adsorbs moisture from the compressed air. The dry air exiting the second column 26 is split into a product flow and a purge flow. The product flow passes through one-way check valve 24 and out of the device as product stream 22. A smaller portion of the dry air exiting column 26 flows through metering capillary 18 where it expands. The expanded dry air then flows up through first column 14 where it desorbs moisture from the first column 14. The moist flow coming out of column 14 then passes through four-way valve 12 and is vented from PSA dryer 4 as moist exhaust flow 16. After operating for about 30 seconds in this backward cycle, the four-way valve 12 is again switched, causing the flow to reverse. The device is operated continuously in this manner, with alternating forward and backward cycles. During each cycle, one of the columns is adsorbing moisture while the other column is being purged of moisture that it adsorbed in the previous cycle.

It is important to note that, due to the pressure drop of the purge flow from 800 kPa to 100 kPa as it passes through metering capillary 18, its volume increases by a factor of eight. Thus, even though the purge flow represents only 18% of the high pressure flow, the volume of the low-pressure purge flow taking up moisture from one column is actually larger than the volume of the high pressure input flow giving up moisture to the other column. Consequently, the dry purge flow is able to remove the moisture adsorbed by the column in the previous cycle, preparing for the next cycle when it will again adsorb moisture from the entering high-pressure flow.

Using commonly available molecular sieve adsorbents, the PSA dryer can reduce the water content of the product stream 22 to a few parts per million (μg/g). To additionally remove secondary components such as carbon dioxide, a pre-filter 8 could be introduced. However, such a filter has the disadvantage that it is expensive, dangerous to handle, and must be disposed of periodically as toxic waste. Alternatively, the molecular sieve adsorbents 28 and 30 can be used to reduce the concentration of various secondary substances. The adsorbents conventionally used in PSA dryers, however, have a significantly higher affinity for water vapor than for other secondary substances. Due to these different affinities, modifications must be made to obtain sufficient reduction of the concentration of secondary substances. For example, the adsorbent columns and adsorbent volume can be increased or the compressor size can be increased to provide a larger purge flow. These solutions, however, add to the cost, size, weight and power consumption of the PSA dryer.

Figure 2:
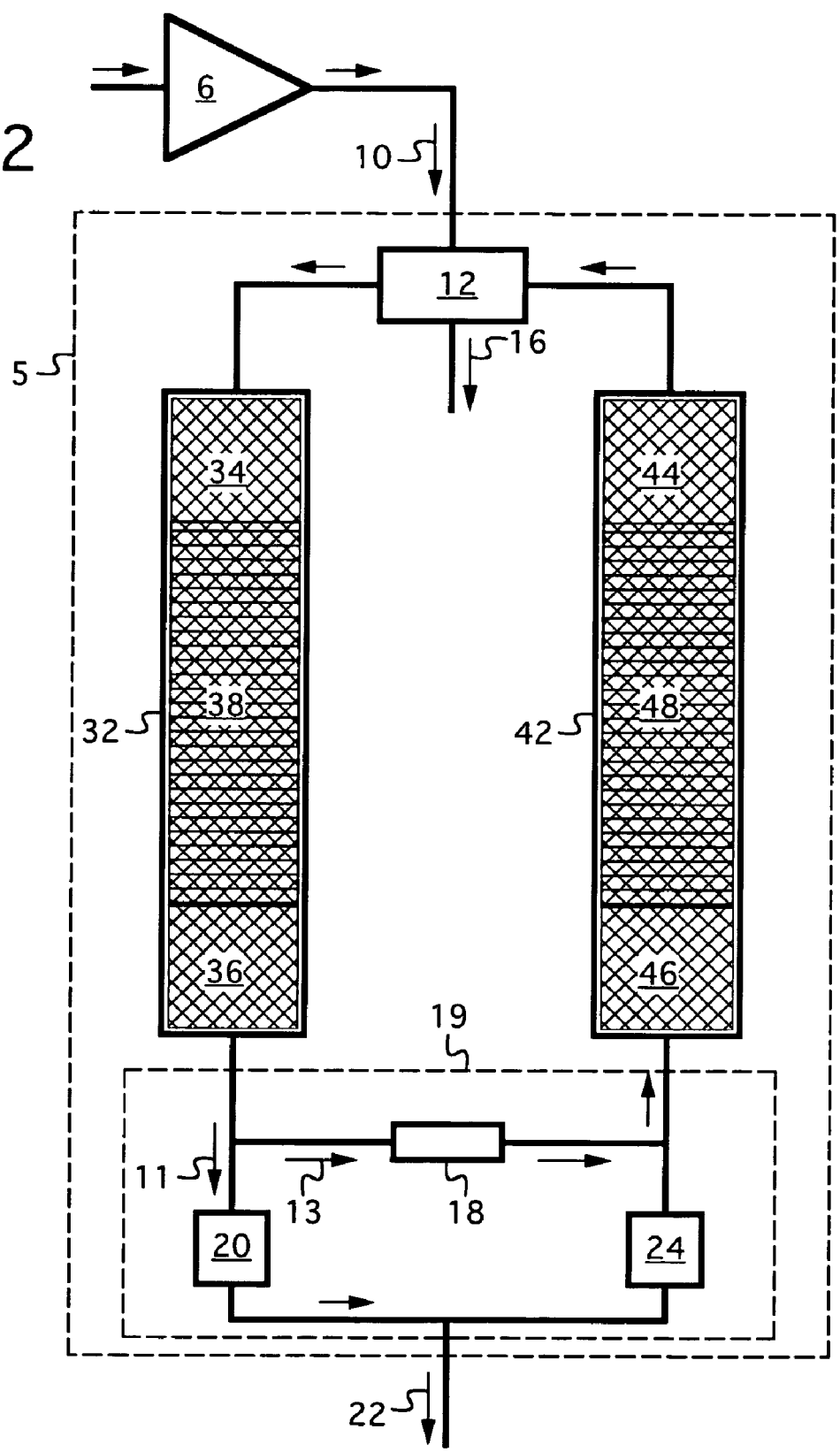
FIG. 2 is a schematic diagram illustrating a PSA dryer including compound adsorbent columns according to an embodiment of the invention.

The present invention provides a solution to the above problems without requiring a larger compressor or larger adsorbent columns. Specifically, a preferred embodiment of the invention provides a PSA dryer 5 containing adsorbent columns 32 and 42, as shown in FIG. 2. Each adsorbent column comprises a compound adsorbent material that simultaneously and selectively adsorbs both primary and secondary substances from a vapor stream flowing through the PSA dryer 5. Specifically, the primary adsorbent selectively adsorbs water while the secondary adsorbent selectively adsorbs carbon dioxide. The primary water adsorbent material is preferably a conventional molecular sieve adsorbent material. The secondary adsorbent comprises a solid amine. Specifically, the secondary adsorbent is preferably a highly porous polystyrene matrix with amine groups bonded to the porous resin structure. The particle sizes in the matrix preferably range from 0.5 to 1.2 mm. A suitable secondary adsorbent material, for example, is a macroporous, divinylbenzene-crosslinked polymer in spherical bead form with benzylamine groups. This material is produced by SYBRON Chemicals, Inc., a Bayer company under the product name VP OC 1065. Pore diameters average 25 nm. The use of this solid amine material for removing carbon dioxide in a spacecraft life-support system is described by G. B. T. Tan, H. Funke, W. Knorr & L. Schauer in "Carbon Dioxide Removal" *Preparing for the Future*, vol. 5, no. 1 (March 1995), European Space Agency, <http://esapub.esrin.esa.it/pff/pffv5n1/tan15.htm>.

In an exemplary embodiment, each compound adsorbent column contains multiple adsorbent layers, each having a specific combination of primary and secondary adsorbent materials. As illustrated in FIG. 2, column 32 has three layers 34, 36, 38, while column 42 has three layers 44, 46, 48. Preferably, intermediate layers 38 and 48 comprise a mixture of the primary and secondary adsorbent materials sandwiched in the columns between top and bottom layers of pure water adsorbent. Each of the top layers 34 and 44 preferably represents approximately 20% of the column volume, and each of the bottom layers 36 and 46 similarly also preferably represents approximately 20% of the column volume, leaving 60% of the volume in each column filled by the intermediate layer mixture. The intermediate layer mixture preferably contains primary and secondary adsorbent materials combined in a volume ratio of approximately 70% to 30% within that layer. Thus, within the entire column, there is approximately 80% primary adsorbent and 20% secondary adsorbent, by volume. These volume ratios are selected to compensate for the different affinities the primary and secondary adsorbents have for water and carbon dioxide, respectively, so that the PSA dryer operates to reduce both water and carbon dioxide concentrations to a few μg/g.

The PSA dryer 5 shown in FIG. 2 with modified adsorbent columns is otherwise analogous in both structure and operation to the conventional PSA dryer 4 shown in FIG. 1. The modified adsorbent columns, however, provide the PSA dryer of FIG. 2 with several advantages over the conventional dryer, as will now be illustrated. During operation, compressor 6 provides a stream of compressed air 10 which enters the PSA dryer at a pressure of about 800 kPa. In the forward cycle, the stream of compressed air 10 enters four-way valve 12 and is directed to first compound adsorbent column 32 which adsorbs water vapor and carbon dioxide present in the stream. While the water vapor is adsorbed by the primary adsorbent, the acidic carbon dioxide is adsorbed selectively by the weak basic amine groups. The reaction, specifically, is:

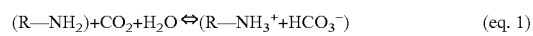

$$(R\text{—}NH_2) + CO_2 + H_2O \Leftrightarrow (R\text{—}NH_3^+ + HCO_3^-) \quad \text{(eq. 1)}$$

The solid amine adsorbent is a regenerative adsorbent, i.e., when the adsorbent is saturated, the weakly bonded carbon dioxide can be desorbed by evacuation, by changing the carbon dioxide partial pressure, or by applying heat. In the case of the PSA dryer, the change in the carbon dioxide partial pressure in the reverse cycle is the primary means of regeneration, although evacuation and temperature may play a secondary role.

The use of the solid amine adsorbent material, the volume ratios of the primary and secondary adsorbents, the stratified layering of specific mixtures of the primary and secondary adsorbents, as well as the specific affinities of these adsorbent materials for water and carbon dioxide, all help allow the adsorbent columns to simultaneously reduce both water and carbon dioxide concentrations to comparably low levels. As a result, the PSA dryer overcomes the various problems associated with the conventional PSA dryer.

In regard to the three-layer stratified design of this exemplary embodiment, note that the amine reacts with carbon dioxide in the presence of water, as shown in the chemical reaction of equation 1 above. In the absence of water the reaction would be driven towards the side that would release carbon dioxide. Thus, the top and bottom layers remove some, but not too much, of the water, so that some moisture is still present in the intermediate layer of the column where the carbon dioxide removal takes place. The use of stratified layers is also preferable to minimize the amount of carbon dioxide adsorbing material. In a uniform, single-layer design, the carbon dioxide adsorption would be ineffective at the dry end of the column where almost all the water has been removed. Thus, it is preferable to have some water present in the intermediate layer while the carbon dioxide is being removed, and then remove that water in an end layer after the carbon dioxide has been removed in the intermediate layer.

Another design consideration specific to the VP OC 1065 adsorbent material relates to the fact that this material is only available commercially as small pellets. To prevent these pellets from obstructing feed and exhaust ports at the top and bottom of the columns, it is preferable to provide layers to isolate these pellets in a region of the column away from the sintered metal filters in the feed and exhaust ports. Thus, top and bottom layers of pure water adsorbent material are used to sandwich the compound adsorbent mixture and isolate the pellets from the feed and exhaust ports. These top and bottom layers are preferably sufficiently thick that they provide this insulation, while also being sufficiently thin that water is still available in the intermediate layer to allow the carbon dioxide reaction to proceed. The inventors have found that, for these specific adsorbent materials, the top and bottom buffer zones are preferably 20% by volume. These competing factors imply a preference for a forward-backward symmetry of adsorbent materials in the column.

Preferably, in the preparation of the stratified columns, the primary and secondary adsorbent materials are pre-mixed for the intermediate layer in order to evenly mix the adsorbents and also to remove the heat resulting from the mixing before filling the plastic columns. The 70:30 ratio of adsorbents in the intermediate layer was found to provide enough carbon dioxide removal without impairing too much the water removal capability. Other combinations are possible depending on the dryness required and the concentration of carbon dioxide that could be tolerated. For example, a range of 80:20 to 60:40 is preferred for embodiments with these specific materials.

In the exemplary embodiment, dry air flows out of column 32 and is divided into a product flow 11 and a purge flow 13. The product flow 11, consisting of about 82% of the dry air, flows through a first one-way check valve 20 and exits the device as a purified product stream 22. The purge flow 13, containing about 18% of the dry air exiting column 32, passes through a restrictive aperture or metering capillary 18 where its pressure drops from 800 kPa to about 100 kPa and its volume increases proportionally. In a variation of this embodiment, the functions of metering capillary 18 and check valves 20 and 24 are provided by a modified shuttle valve 19. The bottom of columns 32 and 42 are connected to each side of the shuttle valve 19 so that the valve's shuttle moves from one side to the other when the direction of flow changes between forward and reverse. The product flow passes out the exit of the shuttle valve 19 as product stream 22. The function of metering capillary 18 is provided by a small hole (e.g., about 0.25 mm in diameter) drilled through the shuttle. This hole acts as an orifice flow restrictor, providing the path for the purge flow 13 to follow.

As the dry purge flow passes through second compound adsorbent column 42, it desorbs water vapor and carbon dioxide present in the column and carries them out of the column, through valve 12, and out of the dryer 5 as a moist exhaust flow 16. While operating in this forward cycle, the amount of moisture and carbon dioxide present in first column 32 increases while the amount of moisture and carbon dioxide present in second column 42 decreases.

After about 30 seconds, the four-way valve 12 is switched to reverse the direction of flow from forwards to backwards. The operation of the device during the backward cycle is analogous to the forward cycle. After operating for about 30 seconds in this backward cycle, the four-way valve is again switched, causing the flow to reverse. The device is operated continuously in this manner, with alternating forward and backward cycles. During each cycle, one of the columns is adsorbing moisture and carbon dioxide while the other column is being purged of moisture and carbon dioxide that it adsorbed in the previous cycle.

The specific values used for high and low pressures, purge volume ratios, adsorbent mixture ratios, and adsorbent layers described in the exemplary embodiment are used for purposes of illustration only. In other embodiments, other values may be used. For example, in an embodiment designed to primarily remove carbon dioxide, very little if any of the water absorption component would be needed in the columns. It should also be noted that the amine adsorbent material takes up water together with carbon dioxide. In other words, it is also a water adsorbent. Thus, the primary and secondary adsorbent materials are not necessarily distinct in the case where a single material serves both roles.

In other embodiments, the ratios and specific mixtures and layers may be varied depending on particular needs, design requirements, and available adsorbent materials. In some embodiments, one may use many adsorbent layers with uniform or varied volumes and adsorbent ratios. In other embodiments, one or two layers may be used.

In other embodiments, the pressures and purge flow amounts may vary. Purge flows are determined by the pressure ratio used in the PSA. If $P_1$ is the purge pressure (normally about 100 kPa) and $P_2$ the high pressure, then the purge flow volume should be greater than $(P_1/P_2)$ of the total high pressure volume of dry air so that the purge volume of low pressure gas is greater than the high pressure volume of gas flowing in each half cycle. The performance improves as the purge volume increases but to minimize cost it is preferably to keep the purge volume as low as possible, but above this limit. It should also be noted that the high pressure value is preferably kept low enough to allow an inexpensive and compact compressor to be used.

The invention claimed is:

1. A pressure swing adsorption (PSA) dryer comprising two adsorption columns, wherein each of the adsorption columns comprises a mixture of primary and secondary adsorbents, wherein the primary adsorbent adsorbs water and the secondary adsorbent adsorbs carbon dioxide, wherein the secondary adsorbent comprises a solid amine;

wherein the mixture is packed in the columns in three layers: a top layer, a bottom layer, and a middle layer sandwiched between the top layer and bottom layer, wherein both the top layer and the bottom layer contain just primary adsorbent material, and wherein the middle layer contains a mixture of the primary and secondary adsorbent materials.

2. The PSA dryer of claim 1 wherein the secondary adsorbent comprises a macroporous, divinylbenzene-crosslinked polymer with benzylamine groups.

3. The PSA dryer of claim 1 wherein the secondary adsorbent comprises a porous polystyrene matrix with amine groups bonded to a porous resin structure.

4. The PSA dryer of claim 1 wherein a volume ratio of the primary adsorbent to the secondary adsorbent in the mixture is approximately 80% to 20%.

5. The PSA dryer of claim 1 wherein the mixture is inhomogeneously packed in the columns in stratified layers.

6. The PSA dryer of claim 1 wherein a volume ratio of the primary adsorbent to the secondary adsorbent in the middle layer is in the range 80:20 to 60:40.

7. The PSA dryer of claim 1 wherein a volume ratio of the middle layer to the top layer is approximately 60% to 20%, and a volume ratio of the middle layer to the bottom layer is approximately 60% to 20%.

8. A method for reducing the concentration of water and carbon dioxide in a gaseous stream using pressure swing adsorption, the method comprising:
   a) passing the gaseous stream through a first adsorbent column to produce a dry flow having reduced water and carbon dioxide content;
   b) dividing the dry flow into a product flow and a purge flow;
   c) increasing the volume and decreasing the pressure of the purge flow to produce an expanded purge flow;
   d) passing the expanded purge flow through a second adsorbent column to produce a moist exhaust flow having increased water and carbon dioxide content; and
   e) reversing the direction of flow through the first and second adsorbent columns;
      wherein each of the first and second adsorbent columns comprises a mixture of primary and secondary adsorbents, wherein the primary adsorbent adsorbs water and the secondary adsorbent adsorbs carbon dioxide, wherein the secondary adsorbent comprises a solid amine;
      wherein the mixture is packed in the columns in three layers: a top layer, a bottom layer, and a middle layer sandwiched between the top layer and bottom layer, wherein both the top layer and the bottom layer contain just primary adsorbent material, and wherein the middle layer contains a mixture of the primary and secondary adsorbent materials.

9. The method of claim 8 wherein the secondary adsorbent comprises a macroporous, divinylbenzene-crosslinked polymer with benzylamine groups.

10. The method of claim 8 wherein the secondary adsorbent comprises a porous polystyrene matrix with amine groups bonded to a porous resin structure.

11. The method of claim 8 wherein a volume ratio of the primary adsorbent to the secondary adsorbent in the mixture is approximately 80% to 20%.

12. The method of claim 8 wherein the mixture is inhomogeneously packed in the columns in stratified layers.

13. The method of claim 8 wherein a volume ratio of the primary adsorbent to the secondary adsorbent in the middle layer is in the range 80:20 to 60:40.

14. The method of claim 8 wherein a volume ratio of the middle layer to the top layer is approximately 60% to 20%, and a volume ratio of the middle layer to the bottom layer is approximately 60% to 20%.

* * * * *